(12) United States Patent
Bentley et al.

(10) Patent No.: US 11,009,581 B2
(45) Date of Patent: May 18, 2021

(54) SYSTEMS, METHODS, AND DEVICES FOR DOPPLER BASED POSITION ESTIMATION

(71) Applicant: The Boeing Company, Chicago, IL (US)

(72) Inventors: Sean F. Bentley, Laguna Niguel, CA (US); Michael J. Greenfield, Anaheim, CA (US); Randall L. Mosten, Irvine, CA (US)

(73) Assignee: The Boeing Company, Chicago, IL (US)

( * ) Notice: Subject to any disclaimer, the term of this patent is extended or adjusted under 35 U.S.C. 154(b) by 473 days.

(21) Appl. No.: 15/622,881

(22) Filed: Jun. 14, 2017

(65) Prior Publication Data

US 2018/0364344 A1 Dec. 20, 2018

(51) Int. Cl.
*G01S 5/02* (2010.01)
*G01S 11/10* (2006.01)

(52) U.S. Cl.
CPC .......... *G01S 5/0294* (2013.01); *G01S 5/0278* (2013.01); *G01S 11/10* (2013.01)

(58) Field of Classification Search
CPC ............................... G01S 11/10; G01S 5/0294
See application file for complete search history.

(56) References Cited

U.S. PATENT DOCUMENTS

| | | | | |
|---|---|---|---|---|
| 5,406,291 A * | 4/1995 | Guerci | ...................... | G01S 5/02 342/424 |
| 6,100,845 A * | 8/2000 | Rose | ......................... | G01S 3/52 342/417 |
| 7,071,892 B2 * | 7/2006 | Astrin | .................... | H01Q 1/088 343/718 |
| 9,007,262 B1 * | 4/2015 | Witzgall | ................... | G01S 5/10 342/357.78 |
| 9,026,151 B2 * | 5/2015 | Opshaug | ............. | H04W 64/003 455/456.6 |

(Continued)

OTHER PUBLICATIONS

Bamberger, et al. "Autonomous Geo location of RF Emitters Using Small , Unmanned Platforms." Johns Hopkins APL Technical Digest, vol. 32, No. 3 (2013). pp. 636-646. (Year: 2013).*

(Continued)

*Primary Examiner* — Gregory C. Issing
(74) *Attorney, Agent, or Firm* — Kwan & Olynick LLP (57) ABSTRACT

Systems, methods, and devices are disclosed herein for Doppler based position estimation. Systems may include an antenna configured to receive a radio frequency (RF) signal from an emitter, and configured to generate an output signal based on the received RF signal. Systems may also include a receiver configured to receive the output signal from the antenna. The receiver may include one or more processors configured to identify a plurality of initial conditions for a plurality of state variables associated with the emitter, obtain a measurement of the RF signal from the emitter and an estimate of an uncertainty associated with the measurement, and generate an output based, at least in part, on an updated estimate of the plurality of state variables, the output identifying a position, velocity, and carrier frequency of the emitter. Systems may also include a communications interface configured to communicatively couple the antenna with the receiver.

20 Claims, 5 Drawing Sheets

(56) References Cited

U.S. PATENT DOCUMENTS

2009/0274072 A1* 11/2009 Knox .................. H01Q 1/2225
370/278
2015/0241545 A1* 8/2015 Lehtomaki ................ G01S 3/14
342/417

OTHER PUBLICATIONS

Groot et al. "Passive Emitter Location with Doppler Frequency and Interferometric Measurements." Proceedings of ESAV '08—Sep. 3-5, Capri, Italy. pp. 1-6. (Year: 2008).*

Linderoth et al. "Initialization of the Kalman Filter without Assumptions on the Initial State." IEEE International Conference on Robotics and Automation. Shanghai, China. May 2011. pp. 4992-4997. (Year: 2011).*

Toloei et al. "State Estimation for Target Tracking Problems with Nonlinear Kalman Filter Algorithms". International Journal of Computer Applications (0975-8887). vol. 98— No. 17, Jul. 2014. pp. 30-36. (Year: 2014).*

Yang et al "A Single Observation Passive Location Algorithm Based on Phase-difference and Doppler Frequency Rate of Change." 2008 IEEE International Conference on Systems, Man and Cybernetics, Singapore, 2008, pp. 1309-1313. (Year: 2008).*

Musicki et al. "Mobile Emitter Geolocation and Tracking Using TDOA and FDOA Measurements". IEEE Transactions on Signal Processing, vol. 58, No. 3. Mar. 2010. pp. 1863-1874. (Year: 2010).*

Welch, G. et al. "An Introduction to the Kalman Filter." UNC at Chapel Hill. Copyright 2001, pp. 1-81. (Year: 2001).*

Thacker et al. "Tutorial: The Kalman Filter." Imaging Science and Biomedical Engineering Division, Medical School, University of Manchester. 1998. pp. 1-10. (Year: 1998).*

"Doppler-shifted frequency measurement based positioning for roadside-vehicle communication systems", Wikipedia, https://www.researchgate.net/publication/220098597_Dopplershifted_frequency_measurement_based_positioning_for_roadside-vehicle_communication_systems, 4 pgs.

"Extended Kalman Filter", Wikipedia, Retrieved from the Internet: https://en.wikipedia.org/w/index.php?title=Extended_Kalman_filter&oldid=750240460, 8 pgs.

Bahrami, Mojtaba et al., Wireless Communications and Mobile Computing 11(7), Retrieved from the Internet: http://gpsworld.com/gnss-systemalgorithms-methodsinnovation-doppler-aided-positioning-11601/, Jul. 2011, 13 pgs.

* cited by examiner

SYSTEMS, METHODS, AND DEVICES FOR DOPPLER BASED POSITION ESTIMATION

TECHNICAL FIELD

This disclosure generally relates to antennas and, more specifically, to position estimation of RF emitters relative to such antennas.

BACKGROUND

Various signal sources may emit signals for wireless transmission. Moreover, antennas, or arrays of antennas, may be used to receive signals from such emitters of signals, which may be radio frequency (RF) emitters. In this way, RF emitters may transmit signals which are received by one or more antennas. The RF emitters may be stationary, or may be mobile and experience positional changes. For example, the RF emitters may be included in mobile vehicles, or may be in buoys that drift in a current or move with water. Furthermore, the antennas may be included in vehicles that are aircraft. Accordingly, both the antennas and the RF emitters may be in motion. Further still, the transmission frequency of the RF emitter may experience drift associated with imperfections in the RF emitter itself. For at least these reasons, conventional techniques remain limited in their ability to efficiently and effectively identify a location of an RF emitter and a carrier frequency of an RF emitter while such motion and frequency drift are occurring.

SUMMARY

Disclosed herein are systems, methods, and devices for Doppler based position estimation. Systems may include an antenna configured to receive a radio frequency (RF) signal from an emitter, and configured to generate an output signal based on the received RF signal. Systems may also include a receiver configured to receive the output signal from the antenna. The receiver may include one or more processors configured to identify a plurality of initial conditions for a plurality of state variables associated with the emitter, obtain a measurement of the RF signal from the emitter and an estimate of an uncertainty associated with the measurement, and generate an output based, at least in part, on an updated estimate of the plurality of state variables, the output identifying a position, velocity, and carrier frequency of the emitter. Systems may also include a communications interface configured to communicatively couple the antenna with the receiver.

In various embodiments, the initial conditions identify initial values of the plurality of state variables, and the plurality of state variables represent an estimated position, velocity, and transmit frequency of the RF emitter. In some embodiments, the one or more processors of the receiver are further configured to obtain a current position and velocity of the receiver, and obtain estimated associated uncertainties of the current position and velocity. In various embodiments, the receiver is included in an aircraft. In some embodiments, the updated estimate is generated based on the measurement of the RF signal. In various embodiments, the updated estimate is additionally generated based on a prior estimate. In some embodiments, the antenna comprises a single electrical antenna. In various embodiments, the emitter is a sonobuoy.

Also disclosed herein are devices that may include a memory, a processor coupled with the memory and configured to identify a plurality of initial conditions for a plurality of state variables associated with an emitter, obtain a measurement of an RF signal received from the emitter at an antenna, obtain an estimate of an uncertainty associated with the measurement, and generate an output based, at least in part, on an updated estimate of the plurality of state variables, the output identifying a position, velocity, and carrier frequency of the emitter. Devices may also include a communications interface configured to communicatively couple the processor with the antenna.

In various embodiments, the initial conditions identify initial values of the plurality of state variables, and the plurality of state variables represent the estimated position, velocity, and transmit frequency of the RF emitter. In some embodiments, the processor is further configured to obtain a current position and velocity of a receiver, and obtain estimated associated uncertainties of the current position and velocity. In various embodiments, the receiver is included in an aircraft. In some embodiments, the updated estimate is generated based on the measurement of the RF signal. In various embodiments, the emitter is a sonobuoy.

Further disclosed herein are methods that may include identifying a plurality of initial conditions for a plurality of state variables associated with an emitter, obtaining a measurement of an RF signal received from the emitter at an antenna, obtaining an estimate of an uncertainty associated with the measurement, generating an output based, at least in part, on an updated estimate of the plurality of state variables, the output identifying a position, velocity, and carrier frequency of the emitter.

In various embodiments, the initial conditions identify initial values of the plurality of state variables, and the plurality of state variables represent the estimated position, velocity, and transmit frequency of the RF emitter. In some embodiments, the methods further include obtaining a current position and velocity of a receiver, and obtaining estimated associated uncertainties of the current position and velocity. In various embodiments, the receiver is included in an aircraft. In some embodiments, the updated estimate is generated based on the measurement of the RF signal. In various embodiments, the emitter is a sonobuoy.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

A moving vehicle may utilize a triangulation method and system to identify the location of radio frequency (RF) emitters, such as buoys. As a result, such techniques require using three or more antennas. For example, such techniques often utilize four, or more than four antennas. Moreover, such techniques may rely on angular measurements that require multiple or directional antennas to estimate the angle of arrival of a signal. Accordingly, such techniques require complicated and hardware intensive antenna arrays that include multiple directional antennas, or precisely phase-matched omni-directional antennas, connectors, and cabling. Moreover, such techniques may utilize complicated processing systems to counteract or compensate for movement of the platform in which the antenna array is mounted, which may be a vehicle such as a plane. Accordingly, such techniques utilize hardware and processing systems that are complicated and incur additional payload weight.

Various systems, devices, and methods disclosed herein enable the localization of an RF emitter. As will be discussed in greater detail below, such localization may be accomplished from a moving platform that has a known position and movement. Embodiments disclosed herein may utilize Doppler measurements of an RF signal transmitted by the RF emitter. The utilization of such measurements as disclosed herein may provide the effective emitter positioning with reduced antenna requirements. For example, embodiments disclosed herein do not require phase-matched antennas and antenna paths. Embodiments disclosed herein also reduce the minimum number of required antennas from four to just one, although more than one may be used if desired. This results in reduced hardware and processing requirements, as well as cost savings of the emitter localization system and the potential to integrate the capability into a wider number of Size, Weight, and Power (SWAP) constrained platforms, without any loss of performance. In addition, embodiments disclosed herein may be implemented with angular based systems to improve localization accuracy.

Figure 1:
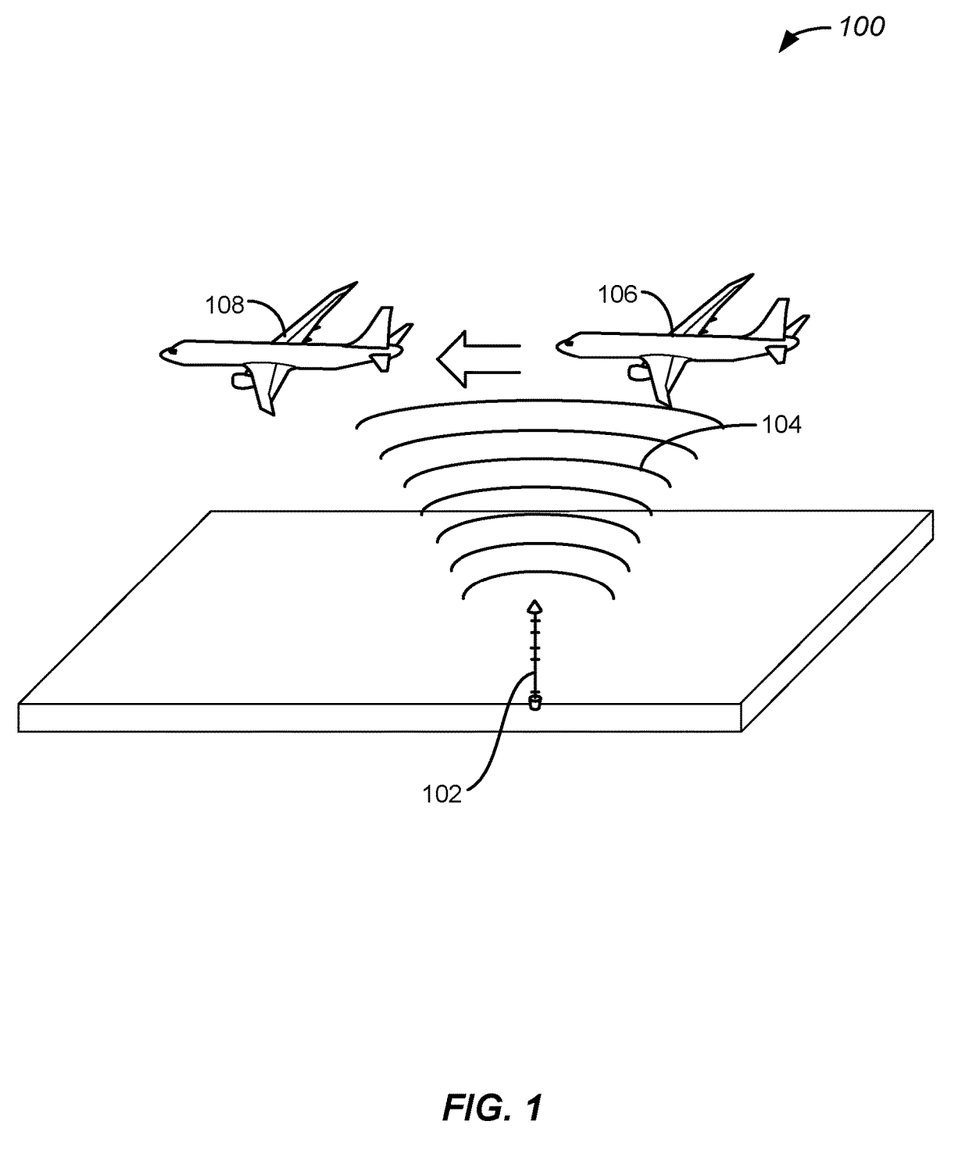
FIG. 1 illustrates an example of a system for Doppler based position location, configured in accordance with some embodiments.

FIG. 1 illustrates an example of a system for Doppler based position location, configured in accordance with some embodiments. As will be discussed in greater detail below, such Doppler based position localization may be utilized to implement accurate localization of an RF emitter as well as accurate identification of its carrier frequency despite movement of the RF emitter and a receiver that receives its RF signal. Moreover, such localization and identification may be implemented using a single antenna.

Accordingly, an RF emitter, such as RF emitter 102 may be deployed in an environment and may be configured to transmit RF emissions including RF signal 104. As will be discussed in greater detail below, RF emitter 102 may be a communications transmitter, or may be a beacon or a marker. Accordingly, RF emitter 102 may be configured to transmit RF signal 104 for various purposes, such as communications purposes and/or localization purposes. Such a signal may have a particular transmit frequency that may also be referred to herein as a carrier frequency, which may be generated as a function of a clock frequency. As will be discussed in greater detail below, such a clock frequency may drift or change due to imperfections in the transmitter. It will be appreciated that RF emitter 102 may be any suitable RF source. In one example, RF emitter 102 may be a buoy that has been dropped in a body of water, such as an ocean. Accordingly, RF emitter 102 may be floating on a surface of an ocean and transmitting RF signal 104. In another example, RF emitter 102 may be included in a land-based vehicle, such as a car or truck. Therefore, RF emitter 102 may transmit RF signal 104 while in motion. In this way, RF emitter 102 may have a direction and velocity while transmitting a signal.

RF signal 104 may be received by a vehicle, such as aircraft 106, which may start receiving RF signal 104 at a first position. Accordingly, aircraft 106 may include a receiver and antenna, as discussed in greater detail below with reference to FIG. 2, that are configured to receive RF signal 104 from RF emitter 102. Accordingly, the receiver may receive emissions from RF emitter 102, and may determine a location and transmission frequency of RF emitter 102 based on such a received signal. As will be discussed in greater detail below, such a determination may be made based, at least in part, on Doppler measurements. Moreover, as will also be discussed in greater detail below, such a determination may be made using a single antenna and without complicated processing hardware that compensates for changes of the orientation of aircraft 106.

As discussed above, aircraft 106 may also be in motion and may receive RF signal 104 while moving to a second position, such as second position 108. As will be discussed below, aircraft may also have a direction and a velocity when receiving RF signal 104. Moreover, aircraft 106 may experience other types of motion, such as rotational movements including aircraft roll, pitch, and yaw. Accordingly, the receiver included in aircraft 106 may receive RF signal 104 from RF emitter 102 while RF emitter 102 is experiencing one or more types of motion, and while aircraft 106 and the receiver are experiencing one or more types of motion. As will be discussed in greater detail below, accurate localization of RF emitter 102 and accurate identification of its carrier frequency may be accomplished despite such movement of RF emitter 102 and the receiver.

Figure 2:
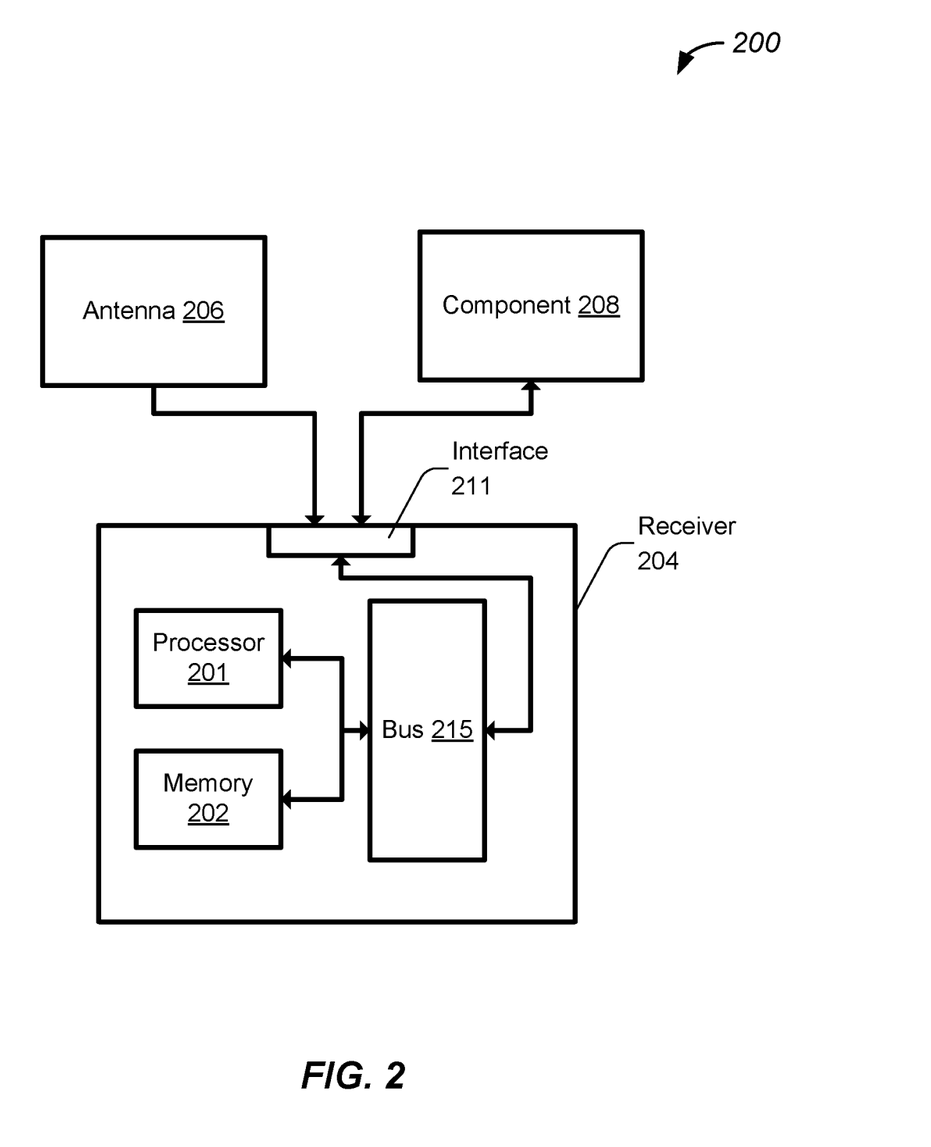
FIG. 2 illustrates another example of a system for Doppler based position location, configured in accordance with some embodiments.

FIG. 2 illustrates an example of a system for Doppler based position location, configured in accordance with some embodiments. As similarly discussed above, such a system may utilize an antenna and a receiver coupled with the antenna to implement such position location and carrier frequency identification. Moreover, as also discussed above, such position location and carrier frequency identification may be implemented without complicated antenna arrays or associated complicated processing circuitry used to compensate for orientation of the receiver.

In various embodiments, system 200 may be implemented in a vehicle, such as aircraft 106 discussed above. Moreover, system 200 may include antenna 206 which may be configured to receive radio waves, such as an RF signal from an RF emitter, and convert the received radio waves to an electrical signal which may be provided to other system components as an output signal. As discussed above, antenna 206 may be a single antenna. However, any suitable number of antennas may be utilized.

System 200 may further include receiver 204 which may be communicatively coupled with antenna 206. In various embodiments, receiver may include processor 201, memory 202, bus 215 and interface 211. In some embodiments, processor 201 may include one or more processors that are configured to implement one or more processing operations. For example, processor 201 may be configured to implement position localization operations and carrier frequency identification operations, such as those discussed in greater detail below. Receiver 204 may further include memory 202 which may be configured to implement data storage operations associated with processor 201. As discussed above, receiver 204 may also include bus 215 which may be configured to enable communication between various components of receiver 204 as well as system 200.

In various embodiments, communications interface 211 may be configured to send and receive data to other system components. For example, communications interface 211 may be communicatively coupled to components of receiver 204, such as processor 201 and memory 202, via bus 215, and may support bidirectional communication with such components. Moreover, communications interface 211 may be communicatively coupled with various other components, such as antenna 206 and component 208, and may support bidirectional communication with such other components. In this way, components of receiver 204 may communicate with other components, such as antenna 206 and component 208 discussed in greater detail below.

In various embodiments, communications interface 211 may be any suitable interface. For example, communications interface 211 may be simple communications port or interface, or may be a device that supports Ethernet interfaces, frame relay interfaces, cable interfaces, and DSL interfaces. In addition, various very high-speed interfaces may be provided such as fast Ethernet interfaces, Gigabit Ethernet interfaces, HSSI interfaces, POS interfaces, FDDI interfaces and the like. Generally, these interfaces may include ports appropriate for communication with the appropriate media. In some cases, they may also include an independent processor and, in some instances, volatile RAM.

As discussed above, system 200 may include component 208. In various embodiments, component 208 may be another system component that may also be implemented on an aircraft, such as aircraft 106 discussed above. For example, component 208 may be a flight computer or other data processing system that may be configured to receive and utilize an output generated by receiver 204. More specifically, receiver 204 may generate an output that identifies a position and carrier frequency of an RF emitter. Moreover, in some embodiments, component 208 may provide information to receiver 204, such as initial estimates of state variables, as will be discussed in greater detail below.

Figure 3:
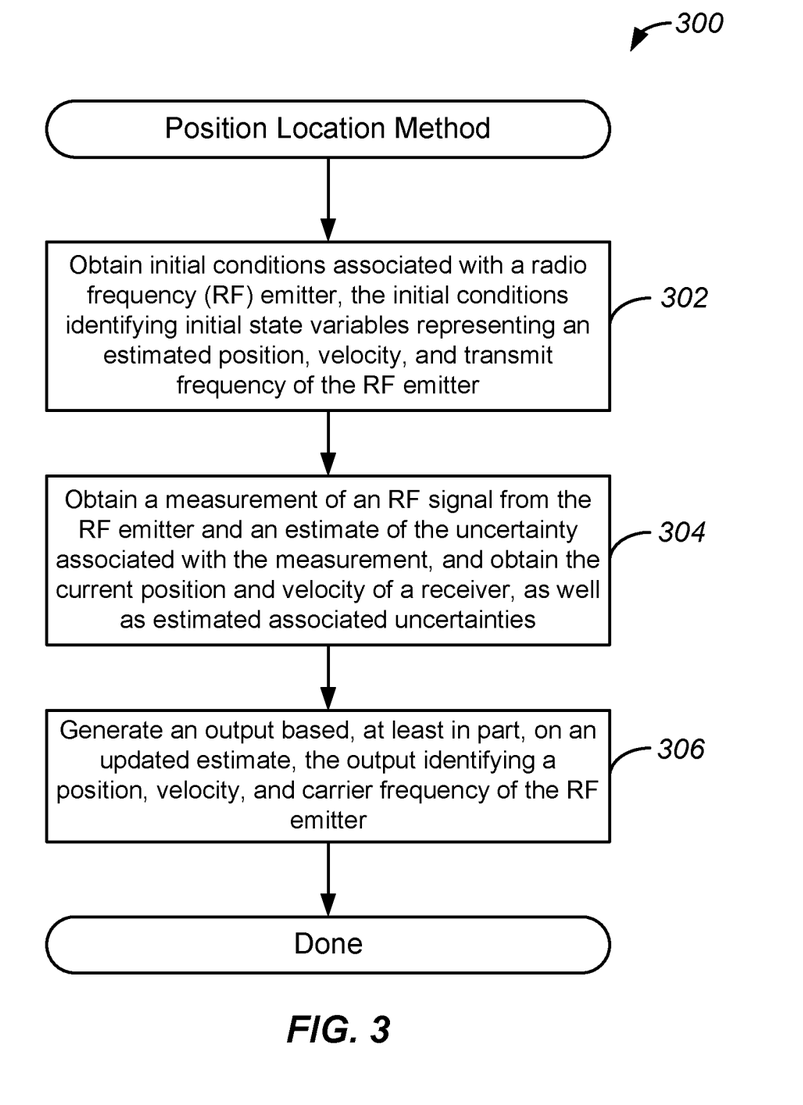
FIG. 3 illustrates an example of a flow chart of a method for Doppler based position location, implemented in accordance with some embodiments.

FIG. 3 illustrates an example of a flow chart of a method for Doppler based position location, implemented in accordance with some embodiments. As similarly discussed above, methods as disclosed herein may provide Doppler based position localization that may be utilized to implement accurate localization of an RF emitter as well as accurate identification of its carrier frequency despite movement of the RF emitter and a receiver that receives its RF signal. Moreover, such localization and identification may be implemented using a single antenna.

Method 300 may commence with operation 302 during which initial conditions associated with an RF emitter may be obtained. In various embodiments, the initial conditions identify initial state variables representing an estimated position, velocity, and transmit frequency of the RF emitter. In various embodiments, the initial conditions may be retrieved from a storage location, such as a memory, or other system component. The initial conditions may provide initial estimates of state variables, such as position and velocity, and may be determined based on last known data associated with a particular RF emitter being analyzed.

Method 300 may proceed to operation 304 during which a measurement of an RF signal from the RF emitter and an estimate of the uncertainty associated with the measurement may be obtained. Moreover, the current position and velocity of a receiver, as well as estimated associated uncertainties, may also be obtained. Accordingly, an RF signal emitted by the RF emitter may be received at the receiver, and measurements may be utilized to adjust a predicted state to reduce an error between an actual observation and an expected observation (as a function of the predicted state). In this way, additional estimations of state variables may be generated, as will be discussed in greater detail below.

Method 300 may proceed to operation 306 during which an output may be generated based, at least in part, on an updated estimate. Accordingly, estimates of the state variables may be updated based on the measurement of the RF signal taken during operation 304, and an output may be generated. In various embodiments, the output identifies a position, velocity, and carrier frequency of the RF emitter. Accordingly, the receiver may identify a position and velocity of the RF emitter, as well as a carrier frequency of the RF emitter, and such state variables may be provided to another system component as an output if appropriate.

Figure 4:
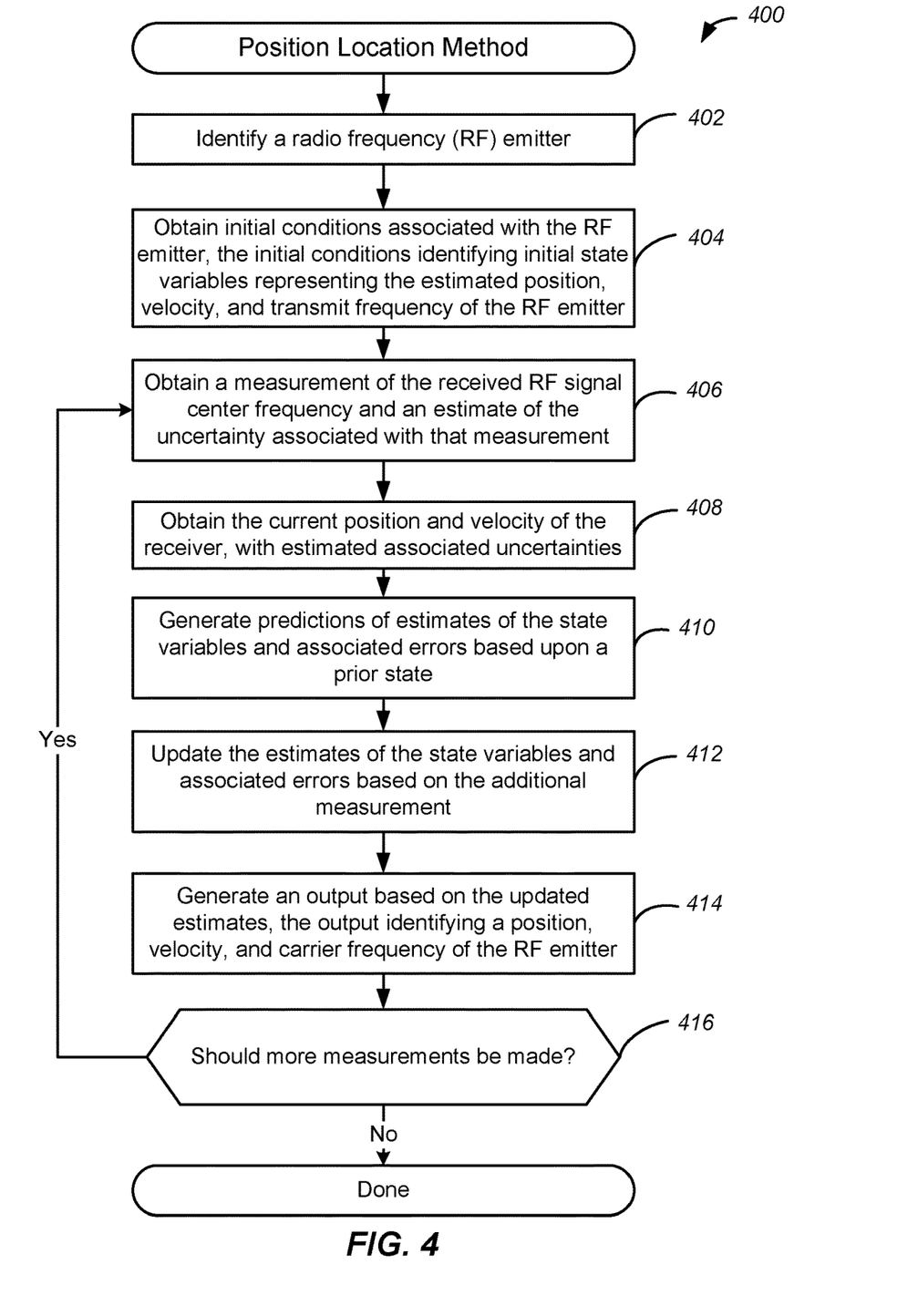
FIG. 4 illustrates another example of a flow chart of a method for Doppler based position location, implemented in accordance with some embodiments.

FIG. 4 illustrates another example of a flow chart of a method for Doppler based position location, implemented in accordance with some embodiments. As similarly discussed above, methods as disclosed herein may provide accurate localization of an RF emitter as well as accurate identification of its carrier frequency despite movement of the RF emitter and a receiver that receives its RF signal. As will be discussed in greater detail below, one or more estimation techniques, such as the use of an Extended Kalman filter, may be implemented to implement such accurate localization and identification.

Method 400 may commence with operation 402 during which an RF emitter may be identified. As discussed above, an RF emitter may be identified based on previously stored information. For example, if an RF emitter is included in a sonobuoy that is known to be in a particular area, information associated with that sonobuoy, such as an RF emitter identifier, may be retrieved. In some embodiments, such previously stored information may have been generated based on previous operations, such as the deployment of the sonobuoy, and such information may be identified responsive to a vehicle including a receiver, such as an aircraft, entering a geographical region or are assigned to the sonobuoy.

Method 400 may proceed to operation 404 during which initial conditions associated with the RF emitter may be obtained. In various embodiments, the initial conditions identify initial values of state variables representing the estimated position, velocity, and transmit frequency of the RF emitter. In some embodiments such initial conditions may be last known information that was stored in memory with the identifier information discussed above. Accordingly, the initial conditions used to generate the initial estimates of the state variables may be retrieved from previously stored data. As discussed above, such data may have been generated during a previous operation, such as the deployment of the sonobuoy. Moreover, such data may be stored in a memory, such as memory 202, or a component, such as component 208 which may be a data processing system that includes a storage device.

In various embodiments, state variables may be represented in a matrix suitable for implementation with one or more estimation techniques, such as particular implementations of a Kalman Filter as disclosed herein. For example, state variables may be stored in a data structure illustrated in equation 1 shown below.

$$X = \begin{bmatrix} x \\ \dot{x} \\ y \\ \dot{y} \\ f \end{bmatrix} \quad (1)$$

Where:

$x$ = East/West offset from receiver to emitter (m) (2)

$\dot{x} = \dfrac{dx}{dt}$ = East/West component of emitter velocity (m/sec) (3)

$y$ = North/South offset from receiver to emitter (m) (4)

$\dot{y} = \dfrac{dy}{dt}$ = North/South component of emitter velocity (m/sec) (5)

$f$ = Emitter transmit center freqency (Hz) (6)

In various embodiments, estimates of uncertainty may also be represented in a matrix suitable for implementation with one or more estimation techniques, such as particular implementations of a Kalman Filter as disclosed herein. For example, estimates of uncertainty may be stored in a data structure illustrated in equation 7 shown below.

$$P_{0|0} = \begin{bmatrix} \sigma^2_{Confidence} & 0 & 0 & 0 & 0 \\ 0 & \sigma^2_{Speed} & 0 & 0 & 0 \\ 0 & 0 & \sigma^2_{Confidence} & 0 & 0 \\ 0 & 0 & 0 & \sigma^2_{Speed} & 0 \\ 0 & 0 & 0 & 0 & \sigma^2_{freq} \end{bmatrix} \quad (7)$$

Where:

$\sigma_{Confidence}$=Initial Confidence(m) (8)

$\sigma_{Speed}$=Initial Speed Error Standard deviation(m/s) (9)

$\sigma_{freq}$=Initial Frequency Error Standard deviation(Hz) (10)

As similarly discussed above, initial values of the state variables and uncertainties may be retrieved from previously stored data. For example, initial state variables may be generated based on known variables at a time of deployment of an emitter, such as a sonobuoy, known estimates of characteristics of an emitter, such as a transmit or carrier frequency, and known estimates of uncertainties, which may be default values generated by a user or previous performance data.

Method 400 may proceed to operation 406 during which a measurement of the received RF signal center frequency may be obtained. Moreover, an estimate of the uncertainty associated with the measurement may also be obtained. Accordingly, a component, such as an antenna may measure a signal transmitted by the RF emitter and record such a signal. The signal may be provided to the receiver such that the receiver obtains the signal, and generates an estimate of uncertainty associated with the measurement. In various embodiments, the estimate of observation uncertainty is a statistical measure that is determined based upon an acquisition method used to measure the received signal, the observed bandwidth and stability of the received signal, the observed power of the received signal at the antenna, and the selected duration of the signal that is used for the estimate. For example, an observation uncertainty may be equivalent to a standard deviation of a measurement. More specifically, an uncertainty of a measured center frequency may be a standard deviation of the measured frequency. Accordingly, the initial estimate of uncertainty associated with the measurement may be a designated value determined based on one or more characteristics of the RF emitter and acquisition method.

Method 400 may proceed to operation 408 during which the current position and velocity of the receiver may be obtained, as well as their associated estimated uncertainties. In various embodiments, the current position and velocity of the receiver, with estimated associated uncertainties, is obtained from one or more components which may be included within the vehicle in which the receiver is mounted, and/or components that are external to the vehicle. For example, they may be obtained from flight data or other external sources such as GPS receivers or inertial navigation systems, and the associated uncertainties may be designated or predetermined values determined based on characteristics of those external sources.

Method 400 may proceed to operation 410 during which predictions of the estimates of the state variables and associated errors may be generated based on a prior state. Accordingly, during operation 410, a predicted state, or an estimation of state variables, may be generated based on the previously retrieved initial conditions, or previous estimates of states if available, and a current observation, which may be the current measurement of the RF signal. In some embodiments, predictions or estimates of associated errors, also referred to herein as variances or covariances, may also be generated, as will be discussed in greater detail below. If no prior state is available, a designated or predetermined value may be used. Accordingly, a predicted state may be calculated based on equations 11 and 12 shown below.

$$X_{n|n-1} = \begin{bmatrix} x_{n|n-1} \\ \dot{x}_{n|n-1} \\ y_{n|n-1} \\ \dot{y}_{n|n-1} \\ f_{n|n-1} \end{bmatrix} = A \begin{bmatrix} x_{n-1|n-1} \\ \dot{x}_{n-1|n-1} \\ y_{n-1|n-1} \\ \dot{y}_{n-1|n-1} \\ f_{n-1|n-1} \end{bmatrix} \quad (11)$$

$$A = \begin{bmatrix} 1 & \Delta t & 0 & 0 & 0 \\ 0 & 1 & 0 & 0 & 0 \\ 0 & 0 & 1 & \Delta t & 0 \\ 0 & 0 & 0 & 1 & 0 \\ 0 & 0 & 0 & 0 & 1 \end{bmatrix} \quad (12)$$

Where, n=update index, and where A is a state matrix. In various embodiments, a predicted variance may be determined. Accordingly, a predicted covariance matrix may be determined based on equation 13 shown below.

$P_{n|n-1} A P_{n-1|n-1} A^* + Q$ (13)

Where, as discussed above, n=update index, and where:

$P_{n|n-1}$=Prediction Covariance (14)

$P_{n-1|n-1}$=Output Error Covariance from prior update (15)

$Q$=5×5 process noise covariance matrix (16)

As similarly discussed above, a physical process may modify the received frequency from the transmitted frequency. Such a physical process may include a Doppler shift. Accordingly, such a physical process may be a function of a range rate, or rate of change of a range, from an emitter. More specifically, the received frequency is shifted by the transmitted frequency by the ratio of the range rate to the speed of light in the atmosphere as referenced in equation 17 and further detailed in equation 20 discussed below. Accordingly, a range may refer to a distance between the RF emitter and the antenna. In one example, the range rate of an emitter, and instantaneous range rate, may be determined based on equation 18 shown below.

$$f_{received} = \left(1 - \frac{\dot{r}}{c}\right)f \tag{17}$$

$$\dot{r}(t) = \frac{dr}{dt} = \frac{2\left[\begin{array}{l}(\dot{x} - v_x)(x + t(\dot{x} - v_x)) + \\ (\dot{y} - v_y)(y + t(\dot{y} - v_y)) - v_z(z - tv_z)\end{array}\right]}{\sqrt{(x + t(\dot{x} - v_x))^2 + (y + t(\dot{y} - v_y))^2 + (z - tv_z)^2}} \tag{18}$$

Where:

$$\dot{r} = \dot{r}(0) = \frac{2[(\dot{x} - v_x)x + (\dot{y} - v_y)y - v_z z]}{\sqrt{x^2 + y^2 + z^2}} \tag{19}$$

The transformation from state to observed frequency may be determined based on equations 20 and 21 shown below. In this way, changes in observed frequencies may be related to a position and range of the RF emitter $$h(X) = \left(1 - \frac{\dot{r}(0)}{c}\right)f + \left(1 - \frac{2[(\dot{x} - v_x)x + (\dot{y} - v_y)y - v_z z]}{c\sqrt{x^2 + y^2 + z^2}}\right) \tag{20}$$

$$f_{obs} = h(X) + \xi \tag{21}$$

Where:

$$h(X) = \text{Prediction function} \tag{22}$$

$$\xi = \text{observation noise} \tag{23}$$

In various embodiments, implementations of an Extended Kalman filter disclosed herein may utilize observation matrix H, which may be calculated as the partial derivative of h(X) evaluated at $X_{n|n-1}$, as shown in equation 24 below.

$$H_n = \left.\frac{\partial h(X)}{\partial X}\right|_{X = X_{n|n-1}} = \tag{24}$$

$$\left[\frac{(\dot{r}x - (\dot{x} - v_x)r)f}{r^2 c} \quad \frac{-fx}{rc} \quad \frac{(\dot{r}y - (\dot{y} - v_y)r)f}{r^2 c} \quad \frac{-fy}{rc} \quad 1 - \frac{\dot{r}}{c}\right]$$

Method 400 may proceed to operation 412 during which the estimates of the state variables and associated errors may be updated based on the additional measurement. Accordingly, during operation 412, a predicted state may be adjusted to reduce an error between an actual observation and an expected observation (as a function of the predicted state). As will be discussed in greater detail below, an update may be determined using an input observation, such as the measured RF signal, as well as a prior iteration estimate that may have been previously determined in a previous iteration of method 400. As will also be discussed in greater detail below, the received center frequency is used as an observation, and a Kalman filter is referenced in Cartesian coordinates to an origin at the receiver latitude and longitude. The approximate estimated prior position in referenced Cartesian coordinates is calculated by use of the range ($r_{n-1}$) and bearing ($\beta_{n-1}$) of the prior position latitude and longitude relative to the current receiver longitude and latitude.

As discussed above, some embodiments disclosed herein may utilize the implementation of an Extended Kalman Filter. However, any suitable nonlinear state estimation technique may be utilized. According to some embodiments, the updating of estimates may be implemented by first determining a Kalman gain, which may be calculated by using equation 25 shown below.

$$K_n = P_{n|n-1} H_n'(H_n P_{n|n-1} H_n' + R)^{-1} \tag{25}$$

For equation 25 shown above, R=Frequency observation variance. An updated covariance and tentative updated state may be calculated using equations 26 and 27 shown below.

$$P_{n|n} = (I - K_n H_n) P_{n|n-1} \tag{26}$$

$$\tilde{X}_{n|n} = X_{n|n-1} + K_n(f_{obs} - h(X_{n|n-1})) \tag{27}$$

In some embodiments, the results of the implementation of the Kalman Filter may be represented or determined relative to previous states or values. For example, results may be represented as an offset. In various embodiments, such a representation may be suitable for implementations where the offset might be limited or filtered. More specifically, an offset from the prior state to the tentative updated state may be given by equation 28 shown below.

$$\Delta \bar{X}_n = \begin{bmatrix} \Delta x_n \\ \Delta \dot{x}_n \\ \Delta y_n \\ \Delta \dot{y}_n \\ \Delta f_n \end{bmatrix} = \tilde{X}_{n|n} - X_{n-1|n-1} \tag{28}$$

The final resulting states are then given by equation 29 shown below.

$$X_{n|n} = X_{n-1|n-1} + \begin{bmatrix} \Delta x_n \\ \Delta \dot{x}_n \\ \Delta y_n \\ \Delta \dot{y}_n \\ \Delta f_n \end{bmatrix} \tag{29}$$

Accordingly, as shown in equation 29, the final resulting state variables may include offsets, velocities, and a transmit frequency of the emitter.

Method 400 may proceed to operation 414 during which an output may be generated based, at least in part, on the updated estimates. In various embodiments, the output identifies a position, velocity, and carrier frequency of the RF emitter. Accordingly, the output may be a data object or a signal that represents the result of the updated state variables. For example, the output may be a data structure that includes the results of equation 29 shown above.

Method 400 may proceed to operation 416 during which it may be determined whether or not additional measurements should be made. In various embodiments, such a determination may be made based on a time index or other counter. For example, a component, such as a receiver may be configured to obtain a designated number of measurements and may step through the measurements incrementally. In some embodiments, the receiver may continue to make measurements until receiving an input signal instructing it to stop. Such a signal may be received from a user, or another system component, such as a flight computer, which may generate such a signal in response to one or more conditions occurring, such as arrival at a particular location, or stopping of a vehicle that includes the receiver. Accordingly, if it is determined that additional measurements should be made, method 400 may return to operation 406. If it is determined that additional measurements should not be made, method 400 may terminate.

While the systems, apparatus, and methods disclosed above have been described with reference to airplanes and the aerospace industry, it will be appreciated that the embodiments disclosed herein may be applied to any other context as well, such as automotive, railroad, and other mechanical and vehicular contexts.

Figure 5:
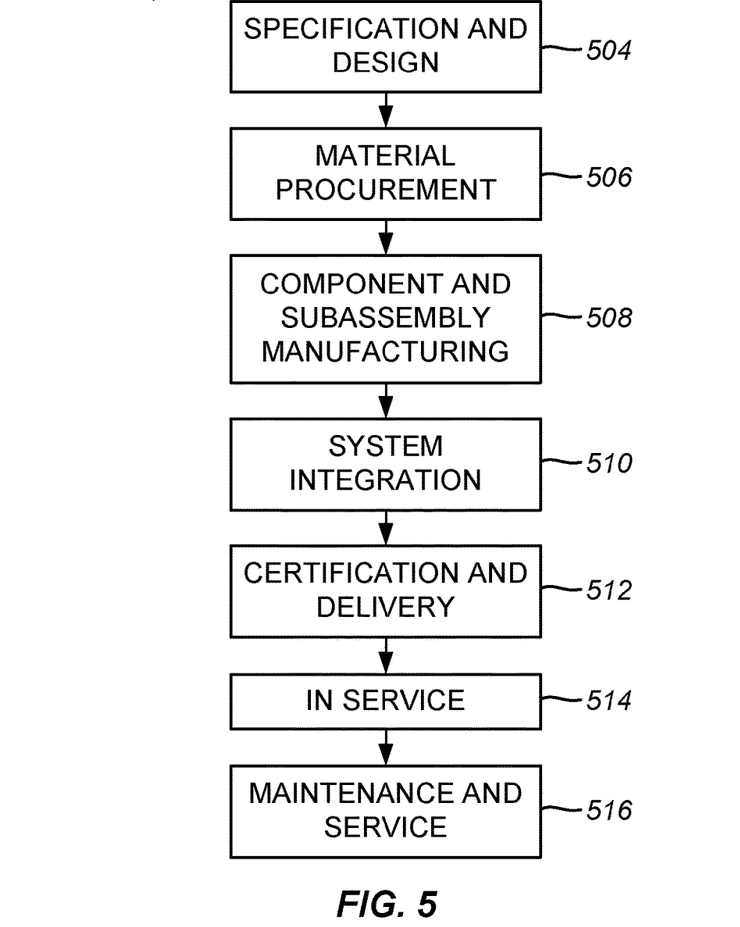
FIG. 5 illustrates a flow chart of an example of an airplane production and service methodology, in accordance with some embodiments.

Accordingly, embodiments of the disclosure may be described in the context of an airplane manufacturing and service method 500 as shown in FIG. 5 and an airplane 502 as shown in FIG. 5. During pre-production, illustrative method 500 may include the specification and design 504 of the airplane 502 and material procurement 506. During production, component and subassembly manufacturing 508 and system integration 510 of the airplane 502 takes place. Thereafter, the airplane 502 may go through certification and delivery 512 in order to be placed in service 514. While in service by a customer, the airplane 502 is scheduled for routine maintenance and service 516 (which may also include modification, reconfiguration, refurbishment, and so on).

Each of the processes of method 500 may be performed or carried out by a system integrator, a third party, and/or an operator (e.g., a customer). For the purposes of this description, a system integrator may include without limitation any number of airplane manufacturers and major-system subcontractors; a third party may include without limitation any number of venders, subcontractors, and suppliers; and an operator may be an airline, leasing company, military entity, service organization, and so on.

Figure 6:
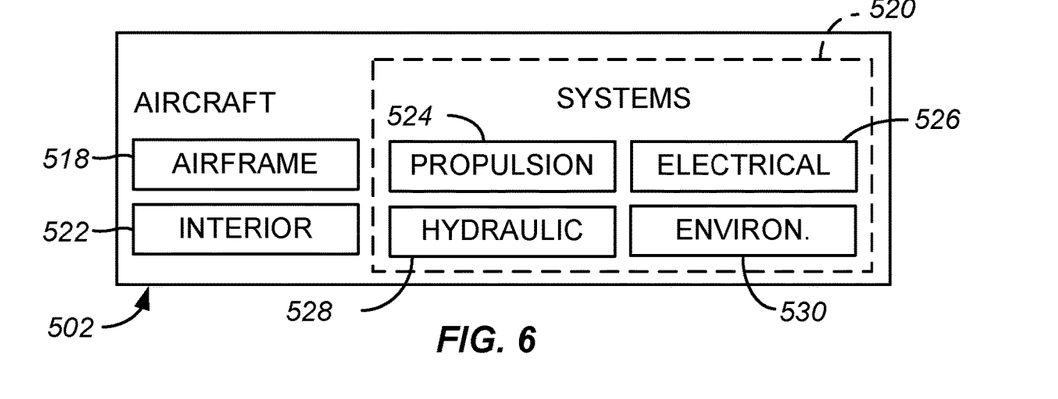
FIG. 6 illustrates a block diagram of an example of an airplane, in accordance with some embodiments.

As shown in FIG. 6, the airplane 502 produced by illustrative method 500 may include an airframe 518 with a plurality of systems 520, and an interior 522. Examples of high-level systems 520 include one or more of a propulsion system 524, an electrical system 526, a hydraulic system 528, and an environmental system 530. Any number of other systems may be included. Although an aerospace example is shown, the principles of the embodiments disclosed herein may be applied to other industries, such as the automotive industry.

Apparatus and methods embodied herein may be employed during any one or more of the stages of the production and service method 500. For example, components or subassemblies corresponding to production process 508 may be fabricated or manufactured in a manner similar to components or subassemblies produced while the airplane 502 is in service. Also, one or more apparatus embodiments, method embodiments, or a combination thereof may be utilized during the production stages 508 and 510, for example, by substantially expediting assembly of or reducing the cost of an airplane 502. Similarly, one or more of apparatus embodiments, method embodiments, or a combination thereof may be utilized while the airplane 502 is in service, for example and without limitation, to maintenance and service 516.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A system comprising:
    an antenna configured to receive a radio frequency (RF) signal from an emitter included in a sonobuoy, and configured to generate an output signal based on the received RF signal;
    a receiver configured to receive the output signal from the antenna, the receiver including one or more processors configured to:
        identify a plurality of initial conditions identifying initial values for a plurality of state variables associated with the emitter and representing an estimated position determined based, at least in part, on a last known position inferred from deployment data of the emitter, the initial conditions being default values generated during deployment of the sonobuoy and retrieved from a memory device;
        obtain a measurement of the RF signal from the emitter and an estimate of an uncertainty associated with the measurement, the estimate of the uncertainty being a designated statistical measure identified based on one or more characteristics of the RF signal, the designated statistical measure comprising a standard deviation of a frequency of the RF emitter;
        obtain a current position and velocity of the receiver from a vehicle navigation component;
        generate an updated estimate of the plurality of state variables based, at least in part, on a prior state, the prior state being determined based on a previous measurement or the initial conditions, the updated estimate being generated based, at least in part, on an observed doppler shift in the RF signal and a range rate associated with the Doppler shift;
        generate an output based, at least in part, on the updated estimate of the plurality of state variables, the output identifying a position, velocity, and carrier frequency of the emitter; and
    a communications interface configured to communicatively couple the antenna with the receiver.

2. The system of claim 1, wherein the initial conditions identify initial values of the plurality of state variables, and wherein the plurality of state variables represent an estimated position, velocity, and transmit frequency of the RF emitter.

3. The system of claim 1, wherein the one or more processors of the receiver are further configured to:
    obtain estimated associated uncertainties of the current position and velocity.

4. The system of claim 3, wherein the receiver is included in an aircraft.

5. The system of claim 1, wherein the updated estimate is generated based on the measurement of the RF signal.

6. The system of claim 5, wherein the updated estimate is additionally generated based on a prior estimate.

7. The system of claim 1, wherein the antenna comprises a single electrical antenna.

8. The system of claim 1, wherein the sonobuoy is deployed from the vehicle.

9. A device comprising:
a memory;
a processor coupled with the memory and configured to:
identify a plurality of initial conditions identifying initial values for a plurality of state variables associated with an emitter and representing an estimated position determined based, at least in part, on a last known position inferred from deployment data of the emitter, the initial conditions being default values generated during deployment of a sonobuoy and retrieved from a memory device;
obtain a measurement of an RF signal received from the emitter at an antenna;
obtain an estimate of an uncertainty associated with the measurement, the estimate of the uncertainty being a designated statistical measure identified based on one or more characteristics of the RF signal, the designated statistical measure comprising a standard deviation of a frequency of the RF emitter;
obtain a current position and velocity of the receiver from a vehicle navigation component;
generate an updated estimate of the plurality of state variables based, at least in part, on a prior state, the prior state being determined based on a previous measurement or the initial conditions, the updated estimate being generated based, at least in part, on an observed doppler shift in the RF signal and a range rate associated with the Doppler shift;
generate an output based, at least in part, on the updated estimate of the plurality of state variables, the output identifying a position, velocity, and carrier frequency of the emitter; and
a communications interface configured to communicatively couple the processor with the antenna.

10. The device of claim 9, wherein the initial conditions identify initial values of the plurality of state variables, and wherein the plurality of state variables represent the estimated position, velocity, and transmit frequency of the RF emitter.

11. The device of claim 9, wherein the processor is further configured to:
obtain estimated associated uncertainties of the current position and velocity.

12. The device of claim 11, wherein the receiver is included in an aircraft.

13. The device of claim 9, wherein the updated estimate is generated based on the measurement of the RF signal.

14. The device of claim 9, wherein the sonobuoy is deployed from the vehicle.

15. A method comprising:
identifying a plurality of initial conditions identifying initial values for a plurality of state variables associated with an emitter and representing an estimated position determined based, at least in part, on a last known position inferred from deployment data of the emitter, the initial conditions being default values generated during deployment of a sonobuoy and retrieved from a memory device;
obtaining a measurement of an RF signal received from the emitter at an antenna;
obtaining an estimate of an uncertainty associated with the measurement, the estimate of the uncertainty being a designated statistical measure identified based on one or more characteristics of the RF signal, the designated statistical measure comprising a standard deviation of a frequency of the RF emitter;
obtain a current position and velocity of the receiver from a vehicle navigation component;
generate an updated estimate of the plurality of state variables based, at least in part, on a prior state, the prior state being determined based on a previous measurement or the initial conditions, the updated estimate being generated based, at least in part, on an observed doppler shift in the RF signal and a range rate associated with the Doppler shift; and
generating an output based, at least in part, on an updated estimate of the plurality of state variables, the output identifying a position, velocity, and carrier frequency of the emitter.

16. The method of claim 15, wherein the initial conditions identify initial values of the plurality of state variables, and wherein the plurality of state variables represent the estimated position, velocity, and transmit frequency of the RF emitter.

17. The method of claim 15, further comprising:
obtaining estimated associated uncertainties of the current position and velocity.

18. The method of claim 17, wherein the receiver is included in an aircraft.

19. The method of claim 15, wherein the updated estimate is generated based on the measurement of the RF signal.

20. The method of claim 15, wherein the sonobuoy is deployed from the vehicle.

* * * * *